United States Patent Office 3,420,825
Patented Jan. 7, 1969

3,420,825
PREPARATION OF 2-SUBSTITUTED-5,6-DIHYDRO-4H-1,3,4-OXADIAZINES
Donald L. Trepanier, Indianapolis, Ind., assignor to The Dow Chemical Company, Midland, Mich., a corporation of Delaware
No Drawing. Filed Sept. 28, 1966, Ser. No. 582,550
U.S. Cl. 260—244
Int. Cl. C07d 87/52
5 Claims

ABSTRACT OF THE DISCLOSURE

A method for the preparation of 2-substituted-5,6-dihydro-4H-1,3,4-oxadiazine compounds by the reaction of an ethylene dihalide with a substituted benzoyl hydrazide in the presence of an alkali metal hydroxide.

---

This invention is concerned with processes for the preparation of 2-substituted-5,6-dihydro-4H-1,3,4-oxadiazine compounds by the reaction of a substituted benzoyl hydrazide and an ethylene dihalide:

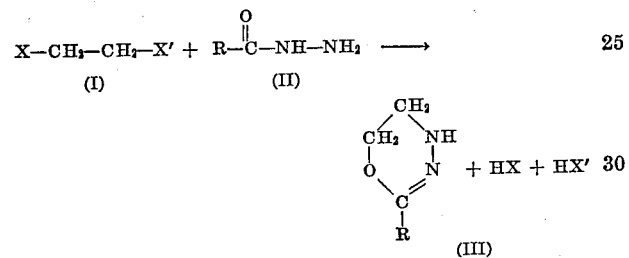

In the present specification and claims, R represents anisyl, phenyl, chlorophenyl, dichlorophenyl, dimethoxyphenyl, trimethoxyphenyl, tolyl or xylyl and X and X' each independently represent chlorine, bromine or iodine. 2-substituted-5,6-dihydro-4H-1,3,4-oxadiazine compounds are disclosed and claimed in my copending application, Ser. No. 582,551, filed concurrently herewith.

In carrying out the process of the invention, an ethylene dihalide, such as ethylene bromide, ethylene chloride, ethylene iodide or 1-bromo-2-iodoethane, and preferably 1-bromo-2-chloroethane, is contacted with a hydrazide corresponding to Formula II and an alkali metal hydroxide. Suitable hydroxides include sodium hydroxide and potassium hydroxide, sodium hydroxide being preferred. The reactants are contacted in the presence of an inert solvent such as methanol, ethanol, water or mixtures thereof. The ethylene dihalide and the hydrazide are consumed by the reaction in equimolar proportions, and the use of these reactants in such proportions is preferred. Since two moles of halide are released for every mole of ethylene dihalide consumed by the reaction, two moles of hydroxide are required for every mole of ethylene dihalide. The use of the alkali metal hydroxide in at least such proportions is desirable and a slight excess of hydroxide is preferred. The reaction proceeds readily on heating, preferably at the boiling point of the reaction mixture. The heating is continued for a short period of time from a few minutes to a few hours, good results being obtained with a heating period of from about 0.5 to 1 hour.

In a convenient procedure for carrying out the process of the invention, the hydrazide, the ethylene dihalide and the alkali metal hydroxide are dissolved in a mixture of ethanol and water, and the resulting solution heated to the reaction temperature. Alternatively, the hydrazide and ethylene dihalide may be dissolved in hot alcohol and a hot alcoholic solution of the hydrazide added to the mixture. In some instances, the reaction is exothermic. Depending upon the amount of water in the reaction mixture, an alkali halide salt precipitates during the reaction period. The salt may be removed by such conventional procedures as filtration and the oxadiazine product may be separated from the reaction mixture by such conventional procedures as extraction and evaporation.

In some cases, it may be convenient to prepare the oxadiazine hydrochloride and to purify the hydrochloride by such methods as recrystallization. In preparing the hydrochlorides, the oxadiazine product is dissolved in a minimum amount of alcohol and the solution treated with ethereal hydrogen chloride. The oxadiazine hydrochloride precipitates on the addition of ether and may be separated by such conventional methods as filtration and decantation.

The following examples illustrate the invention but are not to be construed as limiting the same.

*Example 1.*—Benzoyl hydrazide (34.0 grams; 0.25 mole), 1-bromo-2-chloroethane (35.9 grams; 0.25 mole) and sodium hydroxide (22 grams; 0.55 mole) were dissolved in sufficient ethanol and water to obtain a clear solution and the solution was refluxed for one hour. Part of the ethanol was removed by evaporation in vacuo and the remaining mixture diluted with an equal amount of water and extracted with four portions of ether. The combined ether extracts were washed with two portions of water, the washings were discarded and the washed extracts were dried over anhydrous magnesium sulfate. The dried ether extracts were then evaporated in vacuo to leave a residue of 2-phenyl-5,6-dihydro-4H-1,3,4-oxadiazine as a viscous oil. The structure of the product was confirmed by infrared spectroscopy. The 2-phenyl-5,6-dihydro-4H-1,3,4-oxadiazine product was dissolved in a minimum amount of ethanol and treated with ethereal hydrogen chloride, after which ether was added to the mixture until a precipitate formed. The 2-phenyl-5,6-dihydro-4H-1,3,4-oxadiazine hydrochloride precipitate was separated by filtration, recrystallized from ethanol, recrystallized again from a mixture of ethanol and ethyl acetate and found to melt at 172.5°–174° C. with decomposition.

*Example 2.*—Benzoyl hydrazide (63.1 grams; 0.4636 mole) and 1-bromo-2-chloroethane (66.3 grams; 0.4636 mole) were dissolved in 250 milliliters of methanol and the solution was warmed on a steam bath. To the warm solution was added a hot solution of potassium hydroxide (61 grams; 0.92 mole) in 250 milliliters of methanol. Heat was evolved, the reaction mixture became cloudy and a precipitate formed. The mixture was heated on the steam bath for 20 minutes, and the salt precipitate was removed by suction filtration after the mixture had been cooled. The filtrate was concentrated in vacuo and cooled in an ice bath. Ice water was added to the cooled filtrate. The mixture was extracted with ether and the 2-phenyl-5,6-dihydro-4H-1,3,4-oxadiazine product was separated in substantially the same procedure as in the preceding example.

*Example 3.*—The procedure of Example 1 was followed using 1-bromo-2-chloroethane (24 grams; 0.166 mole), p-tolyl hydrazide (25 grams; 0.166 mole) and sodium hydroxide (15 grams; 0.375 mole). The structure of the resulting 2-(p-tolyl)-5,6-dihydro - 4H - 1,3,4 - oxadiazine product was confirmed by infrared spectroscopy. The corresponding oxadiazine hydrochloride was prepared in the same manner as in Example 1 and the 2-(p-tolyl)-5,6-dihydro-4H-1,3-oxadiazine hydrochloride, recrystallized from ethanol, was found to melt at 188°–189° C. with decomposition.

In substantially the same manner, 2-(p-tolyl)-5,6-dihydro-4H-1,3,4-oxadiazine was prepared using the same molar proportion of 1,2-dibromoethane in lieu of 1-bromo-2-chloroethane.

*Example 4.*—3,4,5-trimethoxybenzoyl hydrazide (100 grams; 0.442 mole), 1-bromo-2-chloroethane (63.5 grams; 0.442 mole) and sodium hydroxide (39.0 grams; 0.975 mole) were mixed in substantially the same procedure as Example 1 to yield 2-(3,4,5-trimethoxyphenyl)-5,6-dihydro-4H-1,3,4-oxadiazine. The structure of the oxadiazine product was confirmed by infrared spectroscopic analysis made on a chloroform solution of the product. The chloroform was evaporated in vacuo and the residue treated with ethereal hydrogen chloride to form 2-(3,4,5-trimethoxyphenyl)-5,6-dihydro-4H-1,3,4 - oxadiazine hydrochloride. The hydrochloride product was separated by filtration, dissolved in hot ethanol and treated with charcoal. The charcoal was removed by filtration and the filtrate was cooled, whereupon the 2-(3,4,5-trimethoxyphenyl)-5,6-dihydro-4H - 1,3,4 - oxadiazine hydrochloride product precipitated. The precipitate was separated by filtration, washed with cold absolute ethanol and recrystallized three times from ethanol. The recrystallized 2-(3,4,5-trimethoxyphenyl)-5,6-dihydro-4H - 1,3,4 - oxadiazine hydrochloride was found to melt at 168° C. with decomposition.

*Example 5.*—Following substantially the same procedure as in Example 1, one molar proportion of m,p-dichlorobenzoyl hydrazide was contacted together with one molar proportion of 1-bromo-2-chloroethane and about two molar proportions of sodium hydroxide. The 2-(m,p-dichlrophenyl)-5,6-dihydro-4H - 1,3,4 - oxadiazine product was recrystallized from ethanol and found to melt at 48°–49° C. The yield was calculated to be 76 percent of the theoretical yield calculated on the basis of hydrazide starting material.

In substantially the same procedure as shown in the preceding examples, other hydrazides can be employed to produce 2 - substituted - 5,6 - dihydro-4H-1,3,4-oxadiazine compounds by contacting the hydrazide with an ethylene dihalide and an alkali metal hydroxide. Suitable hydrazides include p-chlorobenzoyl hydrazide, m,p-dimethylbenzoyl hydrazide, p-anisoyl hydrazide, m,p-dimethoxybenzoyl hydrazide and m-chlorobenzoyl hydrazide.

I claim:

1. The method of making a 2-substituted-5,6-dihydro-4H-1,3,4-oxadiazine compound comprising contacting an ethylene dihalide corresponding to the formula $$X-CH_2-CH_2-X'$$

wherein X and X' each independently represent a member of the group consisting of chlorine, bromine and iodine, with a substituted benzoyl haydrazide corresponding to the formula

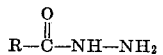

wherein R represents anisyl, phenyl, chlorophenyl, dichlorophenyl, dimethoxyphenyl, trimethoxyphenyl, tolyl or xylyl and an alkali metal hydroxide for a time sufficient to form 2-substituted-5,6-dihydro-4H-1,3,4-oxadiazine and separating the thus-formed oxadiazine.

2. The method of claim 1 wherein the ethylene dihalide, the substituted benzoyl hydrazide and the alkali metal hydroxide are contacted in the presence of an inert solvent selected from the group consisting of methanol, ethanol, water and admixtures of from two to three of the same.

3. The method of claim 2 wherein the ethylene dihalide is 1-bromo-2-chloroethane.

4. The method of claim 2 wherein the alkali metal hydroxide is selected from the group consisting of sodium hydroxide and potassium hydroxide.

5. The method of claim 1 wherein R is phenyl.

References Cited

Trepanier et al., Jour. Med. Chem., vol. 8, pages 802–7 (November 1965).

Trepanier et al., Jour. Med. Chem., vol. 9, pages 753–8 (September 1966).

HENRY R. JILES, *Primary Examiner.*

N. TROUSOF, *Assistant Examiner.*

U.S. Cl. X.R.

260—558, 559